June 26, 1962  P. YALNIZYAN  3,040,531
ROTARY EXTERNAL COMBUSTION ENGINES HAVING
COMPRESSION AND EXPANSION CHAMBERS
OF DIFFERENT SIZES
Filed June 10, 1959  2 Sheets-Sheet 1

INTAKE = EXPANSION ARRGT.

i ⟶ = INTAKE
e ⟵ = EXHAUST

INDICATOR CURVE ABCDFGA, FOR A CONVENTIONAL ENGINE (———)
"         "    ABCDFF'G'A,  "  "  100% EXTENDED EXP. ENG. (—·—·—)
"         "    AB"CD"F"GA,  "  "  50% SUPERCHARGED ENG. (— — —)

INVENTOR
Puzant Yalnizyan

June 26, 1962

P. YALNIZYAN 3,040,531

ROTARY EXTERNAL COMBUSTION ENGINES HAVING
COMPRESSION AND EXPANSION CHAMBERS
OF DIFFERENT SIZES

Filed June 10, 1959

2 Sheets-Sheet 2 i⟶ =INTAKE
e⟵ =EXHAUST    100% EXTENDED EXPANSION ARRGT.

i⟶ =INTAKE
e⟵ =EXHAUST

50% SUPERCHARGED ARRGT.

INVENTOR

Puzant
Yalnizyan

United States Patent Office 3,040,531
Patented June 26, 1962

3,040,531
ROTARY EXTERNAL COMBUSTION ENGINES HAVING COMPRESSION AND EXPANSION CHAMBERS OF DIFFERENT SIZES
Puzant Yalnizyan, 204 Bayview Heights Drive, Toronto 17, Ontario, Canada
Filed June 10, 1959, Ser. No. 819,472
4 Claims. (Cl. 60—39.61)

This invention relates to new and useful mechanical design and arrangements on rotary internal combustion engines, to increase further their overall thermal efficiency and to extend their application on different fields.

In particular, the present invention is directed to a novel arrangement whereby the compression and the expansion chambers can be in different sizes to provide either extended expansion or extended intake for supercharging.

Therefore one object of my invention is to provide further expansion of burnt gases to provide further useful work from the same amount of fuel injected.

Another object of my invention is to provide very low exhaust pressures, therefore to minimize the necessity of the muffler or to call it unnecessary.

Another object of my invention is to provide cooler exhaust gases: this means, on thermal balance sheet, decrease heat losses due to exhaust, therefore increase overall thermal efficiency.

A further object of my invention is to provide a rotary engine which runs on lower temperatures toward the end of cycle, providing lesser necessity of cooling of the engine to prevent material defects due to higher temperatures.

A still further object of my invention is to provide the possibility of manufacturing an engine which could provide more power than the nominal power of that size of engine, solely providing a larger amount of fresh gases through a longer period of intake in a roomier intake chamber.

Another object of my invention is to be able to build an engine which can develop demanded power in locations where the ambient atmospheric pressures are lower than that of normal pressures.

With the foregoing in view, my invention or improvements fall within the novel subject matter hereinafter described in detail and claimed in the specifications and drawings set forth.

In the drawings:

Diagram 1 shows three indicator curves, superposed.

Like reference numerals or characters apply to like parts or significations throughout the specifications and drawings.

Figure 1:
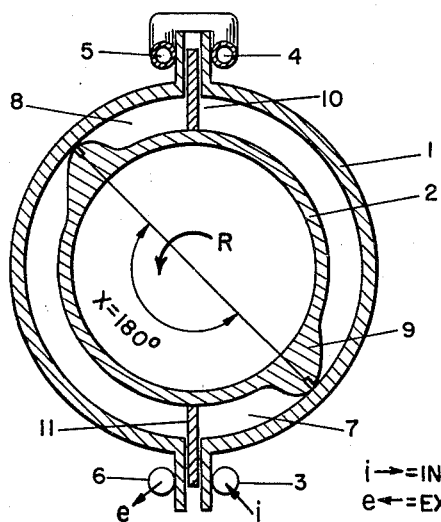
FIGURE 1 is a schematic illustration of a rotary internal combustion engine's section, with equal size of intake and expansion chambers.
Figure 2:
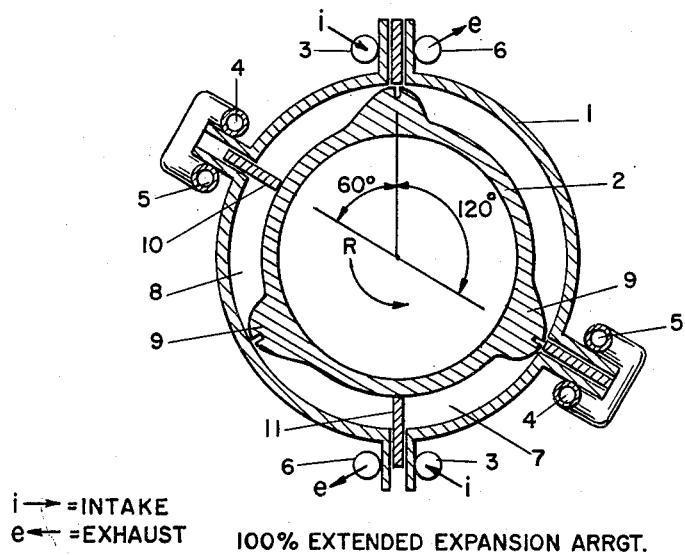
FIGURE 2 is a schematic section of an engine with an extended expansion chamber.
Figure 3:
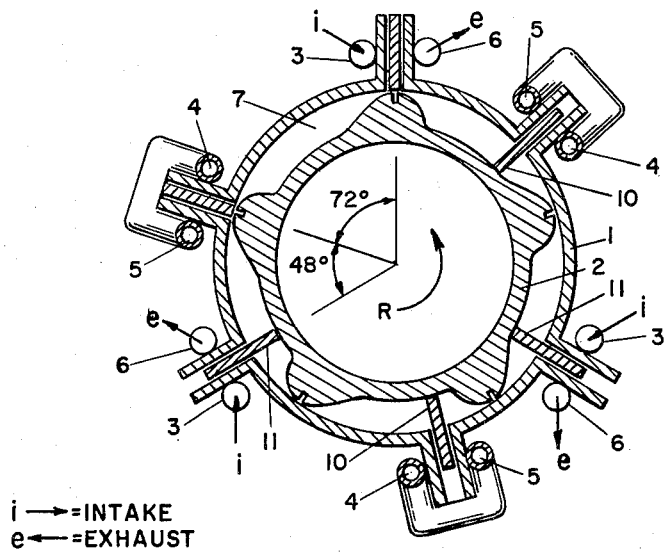
FIGURE 3 is a schematic section of an engine with an extended intake chamber.

Although FIGURES 1–3 of the drawings above referred to are only schematic, they will be found sufficient for a complete understanding of my invention which relates to a novel arrangement whereby the compression and expansion chambers of rotary internal combustion engines may be of different sizes. This arrangement decreases heat losses through exhaust gases and increases the overall efficiency of the engines in the case wherein the expansion chambers are larger than the compression chambers, or in the reverse case, supercharges the engines to give a higher useful work output per unit weight of the engines.

On the figures, the stator is shown as 1 and the rotor as 2, 3 is the entrance port of fresh gases to intake chamber 7, 4 is the entrance port of compressed gases to combustion chamber (not shown on the figures), 5 is the entrance port of burnt gases from combustion chamber to expansion chamber 8, 6 is the exhaust port of burnt and expanded gases from expansion chamber 8 to exhaust pipe or muffler (not shown on the figures), 9 is the impeller vanes located on the periphery of rotor 2, 10 is the compression valve and 11 is the exhaust-intake valve, R shows the direction of the rotation. The angular distance between 3—4 shows complete intake or compression chamber, the angular distance between 5—6 shows the complete expansion chamber. (Other dimensions of said chambers being constant on a given engine do not affect the size of the chamber.)

In general, the relation between the angular distances of compression-expansion chambers in the stator 1 and the angular distance of two consecutive impeller vanes or the rotor 2 may be formulated as follows:

$$N(2+E)=P(1+E)$$
$$PX=360°$$
$$NX'=360°$$

where:

N—Number of compression-expansion chamber sets in the stator 1 (since there is always one expansion chamber for each compression chamber N may be more simply defined as the number of compression chambers).

E—Percentage of extension (extention of expansion or extension of intake).

P—Number of impeller vanes on the rotor 2.

X—Angle between two consecutive impeller vanes.

X'—Angle of one intake-expansion chamber or angular distance of 3, 4, 5, 6.

FIGURE 1 is a typical sample of a regular internal combustion engine where no extended expansion nor extended intake is involved.

Therefore $E=0$ and the formula becomes $2N=P$.

In our case $P=2$ and $N=1$ (one intake and one expansion chamber together). According to the size of the engine these numbers can be multiples of round figures i.e., multiples of 1 (that is in our case) or 2, 3, 4 . . . and $P=2, 4, 6, 8$ . . . and $N=1, 2, 3, 4$ . . . in sequence.

The angle between two consecutive impeller vanes in our case (FIGURE 1, where $P=2$, $N=1$) $PX=360$ or $X=180°$ and the angle of one set of intake-expansion chamber is $NX'=360$, $X'=360°$ (angular distance of 3, 4, 5, 6).

In our case the intake chamber being equal to the expansion chamber, each is 180°.

FIGURE 2 shows a typical sample of an engine with 100 percent extended expansion where $E=1.00$. This means the expansion chamber is twice as large as the intake chamber or, in other words, the expansion chamber has twice as long angular distance as the intake chamber.

Applying the same formulae on this case we find minimum $P=3$ and minimum $N=2$ and $X=120°$, $X'=180°$.

Therefore the intake angular distance is 60° and expansion distance is 120°.

FIGURE 3 shows a typical sample of an engine with 50 percent extended intake (or in other words, with 50 percent supercharging) where $E=0.50$. This means the intake chamber has 50 percent more volume than the expansion chamber, therefore draw 50 percent more fresh gases.

Applying the same formulae on this case we find minimum $P=5$ and minimum $N=3$ and $X=72°$, $X'=120°$.

Therefore the intake angular distance is 72° and the expansion angular distance is 48°.

Figure 4:
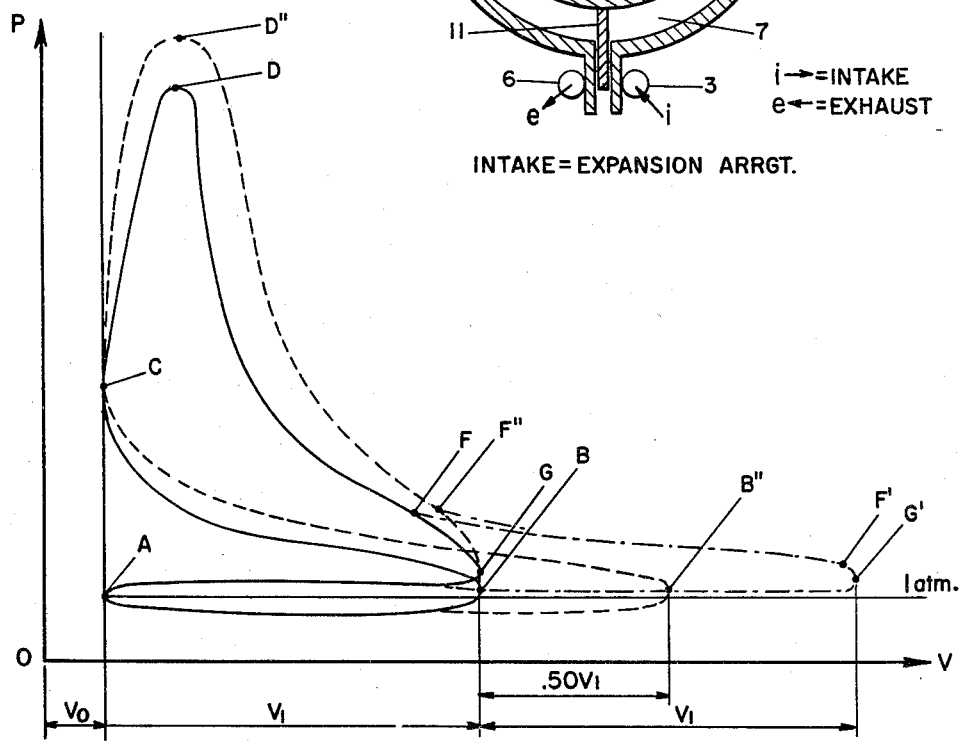

FIGURE 4 shows the three indicator curves which are superposed to ease the comparison.

Curve ABCDFGA represents a regular internal combustion engine.

Curve ABCDFF'G'A represents a rotary internal combustion engine with a 100 percent extended expansion. For the same size of engine and for the same charge of fuel, the area, limited by the portion of the curve FF'G'G, represents an obvious gain of useful work. This means an indisputable increase of efficiency.

Curve AB"CD"F"GA represents a rotary internal combustion engine with a 50 percent extended intake. For the same size of engine 50 percent more feeding of fresh gases results in higher output of power.

As it is seen by the foregoing explanation, my invention permits the realization of a complete thermo-mechanical cycle in a different manner from that of a conventional internal combustion engine and outperforms different results from that of ordinary rotary internal combustion engines; that is, it provides definitely either higher overall thermal efficiencies or higher power output for the same size of engine.

By my arrangement, I have designed a very simple, different and efficient engine, which requires a minimum number of parts. However, it is apparent that further embodiments of my invention will become apparent to those skilled in the art, and they are contemplated in the claims which follow.

While I have herein shown and described only a single form of construction embodying the features of my invention, still I do not intend to limit myself to the said form, because changes in details may be made without departing from the spirit or scope of the invention.

The embodiments of the invention in which an exclusive property or privilege is claimed are defined as follows:

1. A rotary internal combustion engine comprising a stator, a rotor revoluble in the stator, at least two impeller vanes mounted on said rotor, at least two valve members slidable in guide means and adapted to reciprocate radially with respect to the axis of rotation of said rotor and to maintain sealing contact with said rotor, said stator, rotor, impeller vanes and valve members defining at least one compression chamber and at least one expansion chamber for each compression chamber, said compression chamber having a volume which is unequal to the volume of said expansion chamber wherein the relative positions of said impeller vanes and valve members are such that the arc lengths of said compression and expansion chambers satisfy the equation $N(2+E)=P(1+E)$ where N equals the total number of compression chambers, P equals the number of impeller vanes, and E equals the difference between the arc lengths of the compression and expansion chambers divided by the arc length of whichever is the shorter.

2. A rotary internal combustion engine as claimed in claim 1, having more than one compression chamber and in which the impeller vanes and compression chambers are symmetrically disposed about said rotor.

3. A rotary internal combustion engine as claimed in claim 1, having more than one compression chamber and in which said expansion chambers have a larger arc length and hence larger volume than said compression chambers whereby to decrease the heat loss through exhaust gases and to increase the overall efficiency of the engine.

4. A rotary internal combustion engine as claimed in claim 1, having more than one compression chamber and in which the compression chambers have a larger arc length and hence larger volume than said expansion chambers whereby the engine is supercharged to give a higher useful work output per unit weight of the engine.

References Cited in the file of this patent

UNITED STATES PATENTS

| 1,677,805 | Weed | July 17, 1928 |
| 1,846,298 | Alcznauer | Feb. 23, 1932 |

FOREIGN PATENTS

| 473,371 | France | Sept. 19, 1914 |
| 324,817 | Germany | Sept. 3, 1920 |